April 21, 1931.  J. SCHULMAN  1,801,288
WHEEL
Filed June 17, 1926   2 Sheets-Sheet 1
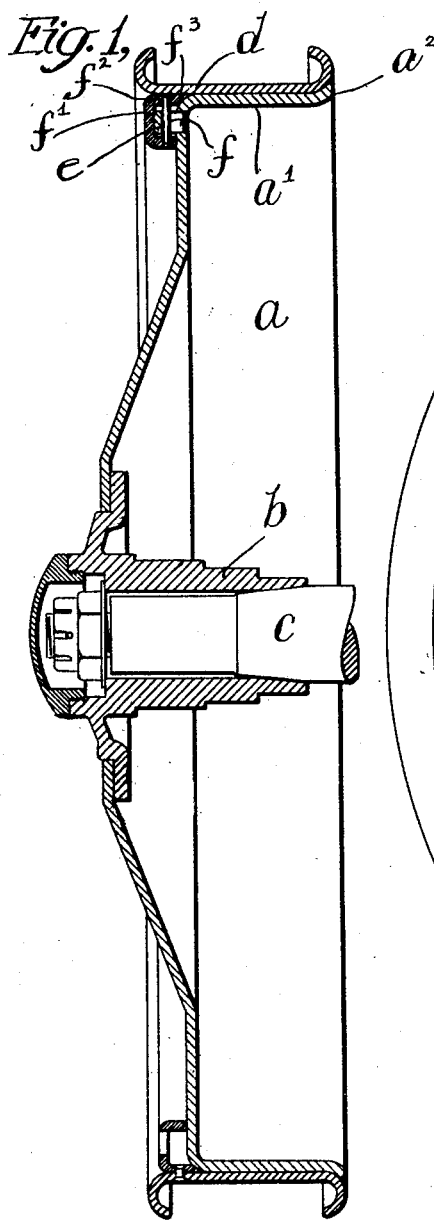
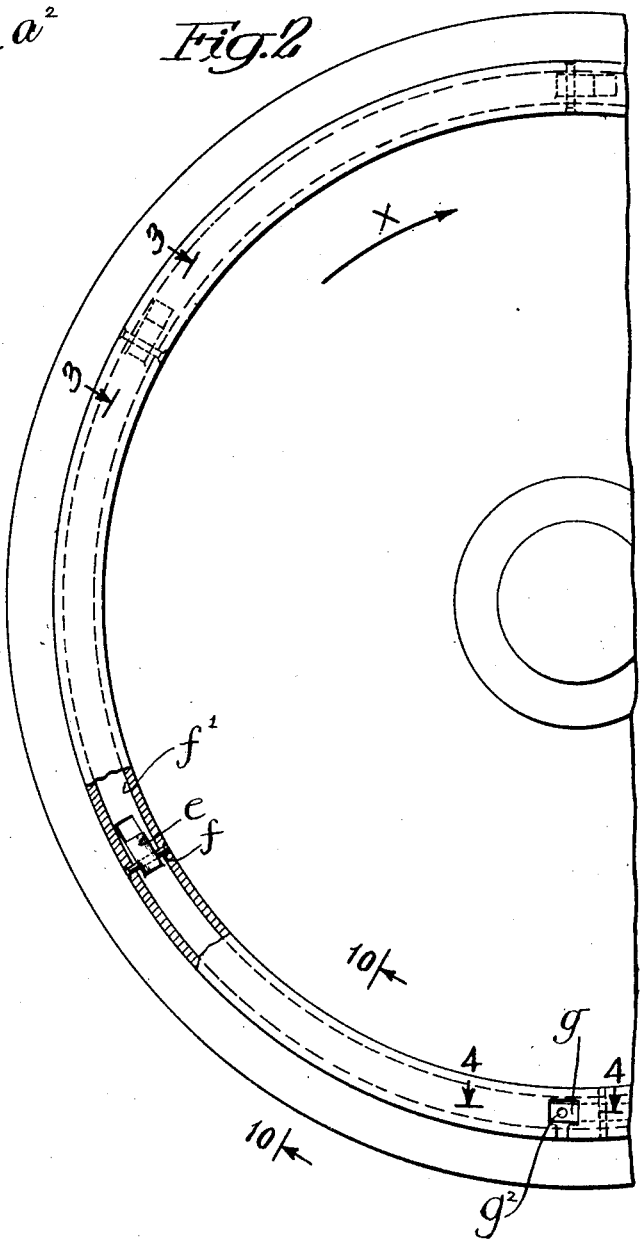
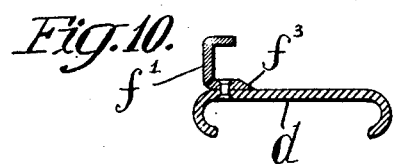
Inventor
Joseph Schulman
By his Attorneys
Redding, Greeley, O'Shea & Campbell April 21, 1931.   J. SCHULMAN   1,801,288
WHEEL
Filed June 17, 1926   2 Sheets-Sheet 2

Inventor
Joseph Schulman
By his Attorneys
Redding, Greeley, O'Shea & Campbell

Patented Apr. 21, 1931

1,801,288

UNITED STATES PATENT OFFICE

JOSEPH SCHULMAN, OF BROOKLYN, NEW YORK

WHEEL

Application filed June 17, 1926. Serial No. 116,505.

This invention relates to vehicle wheels of the kind in which a portion carrying the tire is separable from a hub portion to facilitate the replacement, say, of a damaged tire. More particularly the invention relates to securing means between the respective portions and has for its object the provision of easily operable securing devices which shall do away with the usual plurality of manually operable devices, such as nuts and bolts, customarily availed of to secure the parts together. According to the invention one of the wheel portions is formed with or carries elements adapted to automatically engage cooperating elements carried with the other portion upon relative movement between the wheel portions, certain of the elements requiring manual disengagement to permit the separation of the wheel portions. The invention may be applied between a disc wheel and the hub or between a demountable rim and the felly or its equivalent in a disc wheel. When applied to a demountable rim the felly, say, is formed with or carries a plurality of hook means extending in a circumferential direction to receive eye-like instrumentalities carried with the rim upon relative movement therebetween, and a yielding catch means is also provided on the felly to engage an abutment on the rim when the hook means and eye-like instrumentalities are in engagement to oppose their disengagement; the catch means requiring a positive manual operation to effect its disengagement from the abutment when it is desired to remove the rim. The invention also has for its object the adaptation of the conventional automobile wheels to the automatically engageable demountable rims made according to the present invention. This is accomplished by adapting hook means and catch means to be secured to the felly by the bolts which secure the rims on the conventional wheels. Such adaptation can be made by employing bolts in the same position on the felly.

These and other objects of the invention and the means for their attainment will be more apparent from the following detailed description taken in connection with the accompanying drawings illustrating preferred embodiments thereof, in which:

Figure 1 is a transverse sectional view taken in the plane of a diameter of the wheel and showing the demountable rim and its securing devices according to the invention.

Figure 2 is a fragmentary view in side elevation of the wheel shown in Figure 1.

Figure 10 is a sectional view taken in the plane indicated by the line 10—10 in Figure 2 looking in the direction of the arrows and showing the demountable rim with the protective annulus connected thereto and whereof one side is wedge-shaped to engage the wheel portion.

Figure 3:
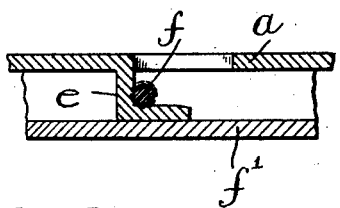
Figure 3 is a detail sectional view taken in the plane indicated by the line 3—3 in Figure 2 looking in the direction of the arrows.
Figure 4:
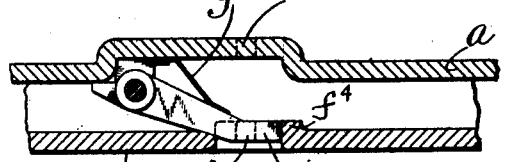
Figure 4 is a detail sectional view taken in the plane indicated by the line 4—4 in Figure 2 looking in the direction of the arrows.
Figure 6:
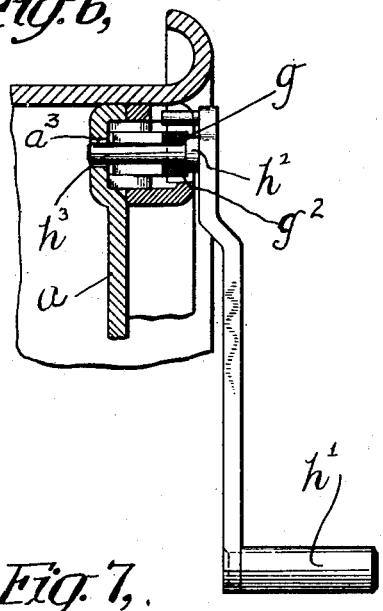
Figure 6 is a sectional view taken in the plane indicated by the line 6—6 in Figure 5 looking in the direction of the arrows.
Figure 5:
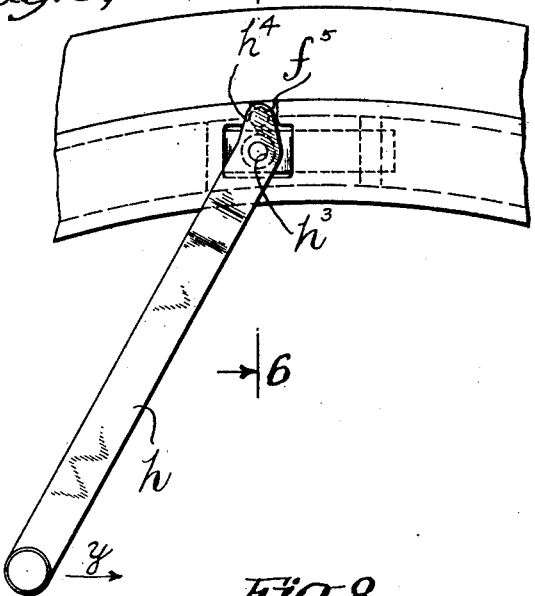
Figure 5 is a view showing a preferred manner of disengaging the catch means by means of a tool which also effects relative movement between the wheel portions.

The invention has been illustrated as applied to a wheel disc $a$ mounted on a hub $b$ supporting the axle $c$ and turned at its periphery at right angles to form the rim receiving portion $a'$ which is again outwardly turned as at $a^2$ to form a stop against which the rim $d$ carrying the tire (not shown) abuts. The wheel disc $a$ is formed on its side with a series of hooks $e$ pressed outwardly from the metal and extending in a generally circumferential direction which are adapted to engage radially extending pins $f$ carried by the rim $d$. To protect the securing devices and present a sightly appearance the pins $f$ are disposed within an annulus $f'$ U-shaped in cross section, adapted to face the wheel disc when the rim and wheel are assembled and whereof one side $f^2$ is secured as by riveting or the like to the rim and is wedge-shaped at its end as at $f^3$ to engage the edge of the wheel disc and contribute to the rigidity with which the parts coact.

A series of these hooks $e$ and pins or eyes $f$ are disposed circumferentially about the wheel and annulus, the hooks all facing in the same circumferential direction so that the rim may be mounted on the wheel by moving the same axially to position against the abutment $a^2$ and then rotating the parts relative to one another until the hooks engage the pins. It is to be noted that the hooks are so turned as to receive the torque when the wheel is turning in a forward direction, as illustrated by the arrow $x$, for instance. To prevent relative slipping of the rim and wheel upon say reversal of rotation of the wheel, which might result in disengagement of the parts a catch $g$ is provided on the wheel $a$ outwardly pressed by the spring $g'$ to automatically engage an abutment $f^4$ formed at the end of a catch receiving aperture in the bottom of the U-shaped annulus $f'$. When the parts are assembled and the rim and wheel rotated until the pins are forced home within the hooks the latch will be forced outwardly by the spring to engage the abutment and prevent all relative movement tending to disengage the parts. The mounting of the rim and its fastening is thus substantially automatic, there being merely the manual operation of rotating the parts in opposite directions to effect the engagement of the securing means.

The fastening devices are so arranged as to prevent unauthorized or accidental disengagement. To this end the action of a tool is required to cause the disengagement of the latch $g$. Accordingly a lever-like tool $h$, conveniently provided with the handle $h'$ may be used to push the latch outwardly, say, by the shoulder $h^2$ on the pin $h^3$ adapted to serve as a fulcrum when passing through the hole $g^2$ in the latch and journaled in a hole $a^3$ in the wheel. Then upon rotating the lever about the fulcrum in the direction of the arrow $y$ the arm $h^4$ fulcrumed within the recess $f^5$ in the annulus, after the latch is depressed, will serve to force the rim and wheel relative to one another until the hooks no longer engage the pins. The rim may then be removed in an axial direction.

Figure 7:
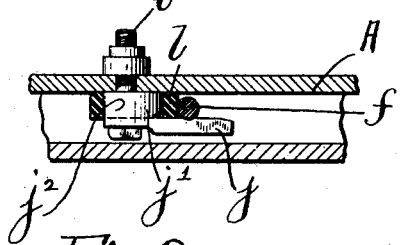
Figures 7 and 8 are fragmentary sectional views similar to Figures 3 and 4 but showing a modification of the invention as applied to wheels of conventional construction.
Figure 8:
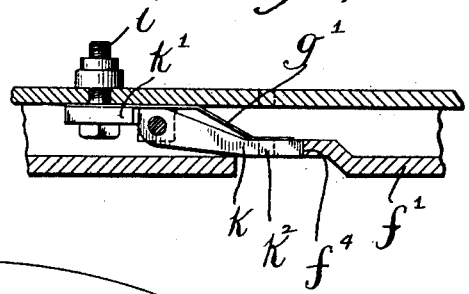
Figure 9:
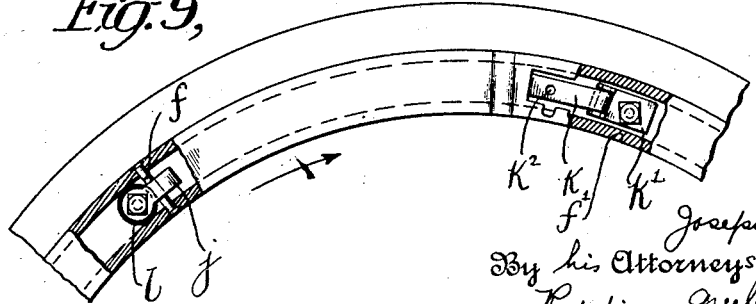
Figure 9 is a fragmentary view in side elevation showing the modification of the invention illustrated in Figures 7 and 8.

In Figures 7 through 9 there is illustrated a modification whereby a wheel of conventional construction may be adapted to receive a demountable rim according to the present invention. The wheel A is provided with the usual bolts $i$. In this instance the hooks $j$ are formed on a lug $j'$ having an axial hole $j^2$ to receive the bolt $i$ and be secured in position thereby to receive the pin $f$ in the usual manner. Similarly the latch $k$ may be pivoted on an apertured lug $k'$ also secured to the wheel by a bolt $i$ and pressed as before by the spring $g'$ into engagement with the stop $f^4$ on the annulus $f'$ of the rim. The same tool $h$ may be availed of with this modification also, a hole $k^2$ being formed in the latch and a hole $a^3$ in the wheel for the reception of the pin $h^3$. The rim is, of course, similar in every respect to that previously described.

If desired, the outwardly extending portion or shank of the hook $e$ or $j$ may be surrounded by yielding non-metallic material, such as a rubber washer $l$ which will be compressed by the pin $f$ and prevent rattle and wear between the parts and further by its resiliency or expansibility contribute to the ease of separation of the parts when they are turned relative to one another.

By the construction described, a demountable rim is provided which may be readily assembled and disassembled upon a wheel with a minimum of effort and whereof the disassembly is prevented except upon a positive manual operation.

Obviously the member $f'$ need not be continuous but may comprise solely supporting and/or masking and protecting eye means on the rim.

Various modifications may be made in the disposition and configuration of the component elements going to make up the invention as a whole without departing from the spirit and scope of the invention.

What is claimed is:

1. In a device of the character described, a wheel upon which a demountable tire rim is carried, a plurality of hooks carried by the side of the wheel and extending in the same circumferential direction thereabout, a demountable rim, a U-shaped annulus carried by the rim and facing the side of the wheel, and a plurality of radially extending pins secured between the arms of the U-shaped annulus to be engaged by the hooks, a spring pressed latch carried by the wheel and disposed to oppose the disengagement of the hooks from the pins, and an abutment carried with the annulus to be engaged by the latch.

2. In a device of the character described, a wheel upon which a demountable tire rim is carried, a plurality of hooks carried by the wheel and extending in the same circumferential direction thereabout, a demountable rim, a U-shaped annulus carried by the rim and facing the wheel, a plurality of radially extending pins carried by the annulus to be engaged by the hooks, a spring pressed latch carried by the wheel and mounted to oppose the dis-engagement of the hooks from the pins, an abutment secured between the arms of the U-shaped annulus to be engaged by the latch, said annulus having an opening adjacent the abutment whereby a tool may enter therein for engagement with the latch and the annulus.

3. The combination with a wheel, of a plurality of hooks carried by the side of the wheel and extending in the same circumferential direction thereabout, a spring pressed latch, having a hole through which a tool may enter, said latch being carried by the side of the wheel and facing in a circumferential direction to oppose the disengagement of the hooks, a demountable rim, a U-shaped annulus carried by the rim, facing the wheel and masking the hooks and latch, and a plurality of radially extending pins secured within the annulus to be engaged by the hooks, respectively, said annulus being formed with an aperture for engagement by the latch, and with a recess adjacent the hole in the latch for engagement by the tool.

This specification signed this 16th day of June, A. D. 1926.

JOSEPH SCHULMAN.